US008286423B2

(12) United States Patent
Yuri et al.

(10) Patent No.: US 8,286,423 B2
(45) Date of Patent: Oct. 16, 2012

(54) COGENERATION SYSTEM

(75) Inventors: Nobuyuki Yuri, Wako (JP); Masahiro Yamamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 426 days.

(21) Appl. No.: 12/257,756

(22) Filed: Oct. 24, 2008

(65) Prior Publication Data
US 2009/0107129 A1    Apr. 30, 2009

(30) Foreign Application Priority Data

Oct. 25, 2007   (JP) ................................ 2007-278195

(51) Int. Cl.
F01N 3/02    (2006.01)
F01N 5/02    (2006.01)
F24D 1/04    (2006.01)
F01K 15/00   (2006.01)
F01K 17/02   (2006.01)

(52) U.S. Cl. ............................. 60/320; 237/12.1; 290/2
(58) Field of Classification Search .................... 60/320; 237/12.1
See application file for complete search history.

(56) References Cited

U.S. PATENT DOCUMENTS

| 4,065,055 A * | 12/1977 | De Cosimo ................... 237/12.1 |
| 4,657,290 A * | 4/1987 | Linden ............................. 290/2 |
| 4,736,111 A * | 4/1988 | Linden ............................. 290/2 |
| 5,228,293 A * | 7/1993 | Vitale ......................... 60/641.14 |
| 5,607,013 A * | 3/1997 | Inoue et al. ..................... 165/207 |
| 5,819,843 A * | 10/1998 | Inoue et al. .................... 165/219 |
| 6,290,142 B1* | 9/2001 | Togawa et al. ................. 237/12.1 |
| 7,040,544 B2* | 5/2006 | Guyer ........................... 237/12.1 |
| 7,284,709 B2* | 10/2007 | Guyer ........................... 237/12.1 |
| 2006/0130888 A1* | 6/2006 | Yamaguchi et al. ........... 136/205 |

FOREIGN PATENT DOCUMENTS

| JP | 57-139111 S | 8/1982 |
| JP | 8-4586 A | 1/1996 |
| JP | 2001-065984 A | 3/2001 |
| JP | 2006-002660 A | 1/2006 |

OTHER PUBLICATIONS

Japanese Office Action dated Nov. 22, 2011, issued in corresponding Japanese Patent Application No. 2007-278195.(w/partial English translation).

* cited by examiner

Primary Examiner — Thomas Denion
Assistant Examiner — Christopher Jetton
(74) Attorney, Agent, or Firm — Westerman, Hattori, Daniels & Adrian, LLP

(57) ABSTRACT

A cogeneration system includes a first cooling device disposed in a cooling water circulation path extending between an engine and a waste-heat heat exchanger, and a second cooling device disposed in a hot water circulation pipe extending between a hot water storage tank and a hot air heater. The first cooling device is activated to cool cooling water when the temperature of hot water stored in the hot water storage tank exceeds a first predetermined value, and the second cooling device is activated to cool the hot water when the temperature of hot air inside the hot air heater exceeds a second predetermined value.

3 Claims, 4 Drawing Sheets

COGENERATION SYSTEM

FIELD OF THE INVENTION

The present invention relates to a cogeneration system that generates electricity using an engine-driven generator while recovering waste heat from the engine to supply heat for hot-water supply.

BACKGROUND OF THE INVENTION

A typical example of the cogeneration systems of the type concerned is disclosed in, for example, JP 08-004586 A. The disclosed cogeneration system includes a gas engine, a generator driven by the gas engine to generate electric energy, and a hot-water heat exchanger (waste-heat heat exchanger) for transmitting waste heat from the gas engine to cold water to thereby produce hot water.

Basic operation control systems for such cogeneration systems includes a so-called "heat-demand priority type" in which operation pattern of the cogeneration system is set according to an amount of hot-water supply required at the output side of the cogeneration system. In this operation control system, when the demand for hot-water supply is not present or low, the gas engine is stopped so as to prevent the temperature of the gas engine from increasing above a predetermine value. Thus, the heat-demand priority type operation control system gives priority to hot-water supply over electricity supply. However, with the gas engine thus stopped, the cogeneration system cannot supply electric energy when required, for example, in case of electric power failure.

It is, therefore, an object of the present invention to provide a cogeneration system which is capable of continuing operation of an engine even when the demand for hot-water supply is not present.

SUMMARY OF THE INVENTION

In one preferred form of the present invention, there is provided a cogeneration system, which comprises: an engine; a generator driven by the engine to generate electric energy; a waste-heat heat exchanger configured to heat cold water to thereby produce hot water by using waste heat from the engine as a first heat source; a hot water storage tank for storing therein the hot water output from the waste-heat heat exchanger; a hot air heater for heating outside air by using the hot water output from the waste-heat heat exchanger as a second heat source; a cooling water circulation path extending between the engine and the waste-heat heat exchanger for circulation therethrough of cooling water; a hot water circulation pipe extending between the hot water storage tank and the hot air heater for circulation therethrough of the hot water; and at least one of a first cooling device and a second cooling device. The first cooling device is disposed in the cooling water circulation path and activated to cool the cooling water when the temperature of the hot water stored in the hot water storage tank exceeds a first predetermined value, and the second cooling device is disposed in the hot water circulation pipe and activated to cool the hot water when the temperature of hot air inside the hot air heater exceeds a second predetermined value.

Conventionally, in cogeneration systems of the type employing the so-called "heat-demand priority type operation control system", when the temperature of hot water stored in the hot water storage tank increases up to a temperature where sufficient cooling of the engine cannot be achieved, the engine must be stopped. By contrast, according to the invention, because the first cooling device is activated when the hot water temperature inside the hot water storage tank exceeds the first predetermined value, the temperature of the waste-heat heat exchanger is kept below the first predetermined value. This will allow for continuous running of the engine, ensuring continuous running of the engine-driven generator leading to stable supply of electric power from the generator.

In another preferred form of the present invention, there is provided a cogeneration system, which comprises: an engine; a generator driven by the engine to generate electric energy; a waste-heat heat exchanger configured to heat cold water to thereby produce hot water by using waste heat from the engine as a first heat source; a hot air heater for heating outside air by using the hot water output from the waste-heat heat exchanger as a second heat source; a cooling water circulation path extending between the engine and the waste-heat heat exchanger for circulation therethrough of cooling water; a hot water circulation pipe extending between the waste-heat heat exchanger and the hot air heater for circulation therethrough of the hot water; and at least one of a first cooling device and a second cooling device. The first cooling device is disposed in the cooling water circulation path and activated to cool the cooling water when the temperature of the hot water inside the hot water circulation pipe exceeds a first predetermined value, and the second cooling device is disposed in the hot water circulation pipe and activated to cool the hot water when the temperature of hot air inside the hot air heater exceeds a second predetermined value.

With this arrangement, since the first cooling device is activated when the hot water temperature inside the hot water circulation pipe exceeds the first predetermined value, the temperature of the waste-heat heat exchanger is kept below the first predetermined value. Thus the same advantageous effects as described above with respect to the first preferred form of the invention can be also attained in the second preferred form of the invention.

Preferably, the first cooling device includes a first bypass pipe branching off the cooling water circulation path and then returning to the cooling water circulation path, a first radiator disposed in the first bypass pipe for radiating heat from the cooling water to the outside of the second bypass pipe, a first pump disposed in the first bypass pipe for feeding the cooling water into the first radiator, and a pair of first water supply valves disposed between the cooling water circulation path and the first radiator and adapted to open to thereby allow the cooling water to be introduced into the first radiator. The second cooling device includes a second bypass pipe branching off the hot water circulation pipe and then returning to the hot water circulation pipe, a second radiator disposed in the second bypass pipe for radiating heat from the hot water to the outside of the second bypass pipe, a second pump disposed in the second bypass pipe for feeding the hot water into the second radiator, and a pair of second water supply valves disposed between the hot water circulation pipe and the second radiator and adapted to open to thereby allow the hot water to be introduced into the second radiator.

The first and second cooling devices of the foregoing construction are relatively easy to construct, can save the equipment cost, and require low running cost.

The cogeneration system may further comprise an auxiliary heating device disposed in at least one of a hot water circulation path extending between the waste-heat heat exchanger and the hot water storage tank, the hot water circulation pipe, and a hot air passage defined in the hot air heater. In the case where the auxiliary heating device is disposed in the hot water circulation path, it is possible to increase the temperature of hot water to a proper temperature even when the temperature of the cooling water is relatively low. Alternatively, when the auxiliary heating device is disposed in the hot air passage of the hot air heater, the hot air heater is able to achieve a predetermined heating performance even when the temperature of the hot water is relatively low.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
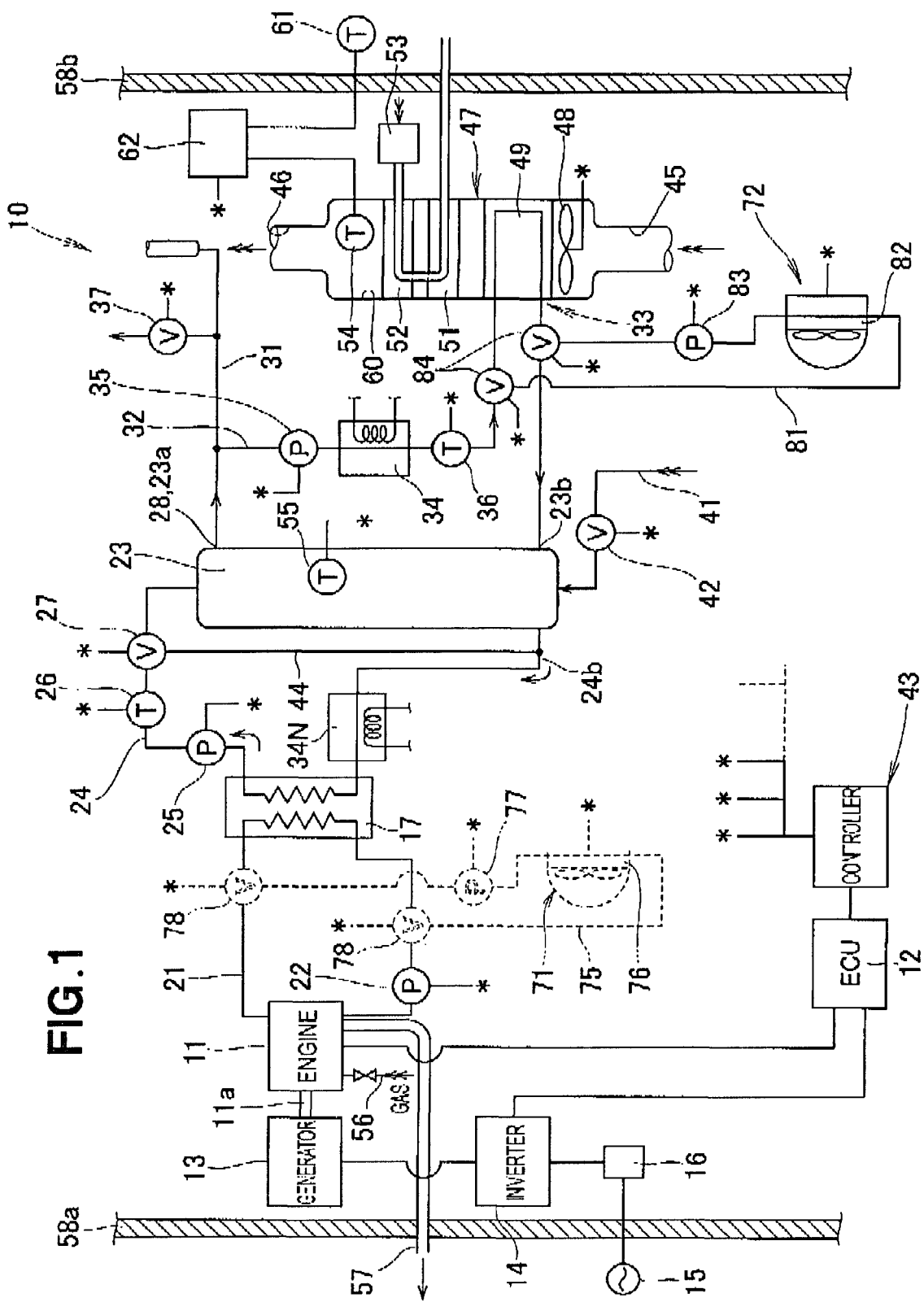
FIG. 1 is a diagrammatical view showing the general configuration of a cogeneration system according to a first embodiment of the present invention.

Referring now to the drawings, wherein like reference characters designate like or corresponding parts throughout the several views, FIG. 1 diagrammatically shows the general configuration of a cogeneration system 10 according to a first embodiment of the present invention.

The cogeneration system 10 generally comprises an engine 11 as a prime mover, an electric control unit (ECU) 12 for controlling the engine 11, a generator 13 connected to an output shaft 11a of the engine 11 and driven by the engine output shaft 11a to generate electric energy (electricity), an inverter unit 14 connected to an output terminal of the generator 13, a changeover switch 16 disposed between the inverter unit 14 and an external commercial power supply 15 to shut off the supply of generated electric energy except when predetermined conditions are met, a waste-heat heat exchanger 17 configured to produce hot water using waste heat from the engine 11 as a heat source and output the hot water therefrom, a cooling water circulation path 21 extending between the engine 11 and the waste-heat heat exchanger 17 for circulation of the cooling water, a cooling water circulation pump 22 disposed in the cooling water circulation path 21 for feeding the cooling water to the engine 11 after the cooling water has emitted heat at the waste-heat heat exchanger 17, a hot water storage tank 23 for storing hot water heated via heat transfer at the waste-heat heat exchanger 17, a hot water circulation path 24 extending between the hot water storage tank 23 and the waste-heat heat exchanger 17 for circulation therethrough of the hot water, a hot water pump 25, a temperature sensor 26 and a temperature regulating valve 27 which are disposed in the hot water circulation path 24, a hot water output pipe 31 connected to a hot water outlet port 23a at an upper end of the hot water storage tank 23 for outputting the hot water from the hot water storage tank 23, a hot water circulation pipe 32 extending from the hot water outlet 23a of the hot water storage tank 23 and returning to a hot water return port 23b at a lower end of the hot water storage tank 23 for circulation of the hot water, a hot air heater 33 disposed in the hot water circulation pipe 32, a first auxiliary heating means or device 34 disposed in the hot water circulation pipe 32 upstream of the hot air heater 33 for heating the hot water when needed, an output hot water pump 35 and a temperature sensor 36 which are disposed in the hot water circulation pipe 32 upstream of the hot air heater 33, a drain valve 37 connected via the hot water output pipe 31 to the hot water outlet port 23a and adapted to open for draining off the hot water, a water supply path 41 for supplying water to the hot water storage tank 23, a water supply valve 42 disposed in the water supply path 41 and adapted to open where necessary, and a control unit or controller 43 for controlling the overall operation of the cogeneration system 10.

A bypass path 44, which bypasses the hot water storage tank 23, has one end connected to the temperature regulating valve 27 and the other end connected to a return pipe 24b of the hot water circulation path 24 extending from the hot water storage tank 23 to the waste-heat heat exchanger 17. The temperature regulating valve 27 is configured such that when the temperature of the hot water inside the hot water circulation path 24, which is detected by the temperature sensor 26, reaches a predetermined temperature (70° C., for example), the temperature regulating valve 27 gradually opens to thereby start supplying hot water into the hot water storage tank 23 from an top end thereof. The temperature regulating valve 27 has a valve opening set to increase with an increase in the temperature of the hot water.

An auxiliary heating means or device 34N is disposed in the hot water circulation path 24 for heating the hot water while being circulating through the hot water circulation path 24. By thus providing the auxiliary heating device 34N, it is possible to increase the temperature of the hot water up to a proper temperature even when the cooling water of the engine 11 is low. The cogeneration system 10 further includes at least one of a first cooling means or device 71 (indicated by broken lines in FIG. 1) and a second cooling means or device 72.

The first cooling device 71 is disposed in the cooling water circulation path 21 extending between the engine 11 and the waste-heat heat exchanger 17. The first cooling device 71 is activated by the controller 43 when the temperature of the hot water inside the hot water storage tank 23 exceeds a first predetermined value. The second cooling device 72 is disposed in the hot water circulation pipe 32 extending between the hot water storage tank 23 and the hot air heater 33 for circulation of the hot water. The second cooling device 72 is activated by the controller 43 when the temperature of hot air inside the hot air heater 33 exceeds a second predetermined value.

In FIG. 1, connections between the controller 43 and various components of the cogeneration system 10 are indicated by asterisks (*).

The first and second cooling devices 71 and 72 will be described below in greater detail. The first cooling device 71 includes a first bypass pipe 75 branching off the cooling water circulation path 21 and then returning to the cooling water circulation path 21, a first radiator 76 disposed in the first bypass pipe 75 for radiating heat from the cooling water outside the bypass pipe 75, a first pump 77 disposed in the bypass pipe 75 for feeding the cooling water into the first radiator 76, a pair of first water supply valves 78, 78 disposed between the cooling water circulation path 21 and the first radiator 76 and adapted to open to thereby allow the cooling water to be introduced into the first radiator 76.

The second cooling device 72 includes a second bypass pipe 81 branching off the hot water circulation pipe 32 and then returning to the hot water circulation pipe 32, a second radiator 82 disposed in the second bypass pipe 81 for radiating heat from the hot water outside the bypass pipe 81, a second pump 83 disposed in the bypass pipe 81 for feeding the hot water into the second radiator 82, a pair of second hot water supply valves 84, 84 disposed between the hot water circulation pipe 32 and the second radiator 82 and adapted to open to thereby allow the hot water to be introduced into the second radiator 82.

The first and second cooling devices 71 and 72 of the foregoing construction are relatively easy to construct, can save the equipment cost, and require low running cost.

The hot air heater 33 includes an elongated casing 47 defining a hot air passage 60 and having an inlet opening 45 and an outlet opening 46, a blower 48 disposed in the casing 47 adjacent the inlet opening 45, a heat exchanger 49 disposed in the casing 47 downstream of the blower 48 and arranged in heat-exchanging relation to a part of the hot water circulation pipe 32, a latent-heat heat exchanger 51 and a sensible-heat heat exchanger 52 disposed in the casing 47 downstream of the heat exchanger 49 in the order named, and a burner unit 53 for supplying heated hot air to the sensible-heat heat exchanger 52. The burner unit 53 constitutes an auxiliary heating means or device provided in the hot air passage 60.

Fuel gas generated by the burner unit 53 passes successively through the sensible-heat heat exchanger 52 and the latent-heat heat exchanger 51 and then is discharged to the outside of a building. Heat is transmitted to air as the air is driven by the blower 48 to pass through the latent-heat heat exchanger 51 and the sensible-heat heat exchanger 52. The burner unit 53 is operated when the room temperature falls much below a setting temperature or when the room temperature does not go up even after the elapse of a predetermined time.

By virtue of the burner unit 53 provided as an auxiliary heating device for heating hot air inside the hot air passage 60, the hot air heater 33 is able to achieve a predetermined heating performance even when the temperature of the hot water introduced in the heat exchanger 49 is relatively low. Either of the auxiliary heating device 34N disposed in the hot water circulation path 24 or the auxiliary heating device (burner unit) 53 disposed in the hot air passage 60 may be omitted.

The inlet opening 45 of the casing 47 of the hot air heater 33 is connected to a return pipe (not shown) so that cool air from each individual room of the building returns to the hot air heater 33. The outlet opening 46 of the casing 47 of the hot air heater 33 is connected to a supply pipe (not shown) so that hot air is supplied from the hot air heater 33 to the individual rooms of the building. In FIG. 1, reference numeral 55 denotes a temperature sensor 55 disposed within the hot water storage tank 23, reference numeral 56 denotes a gas pipe for supplying a fuel gas to the engine 11, reference numeral 57 denotes an exhaust pipe for discharging exhaust gases from the engine 11 to the outside of the building, and reference numerals 58a and 58b are wall portions of the building, which define an interior space therebetween. Reference numeral 61 is a temperature sensor disposed outside the building, and reference numeral 62 is a remote controller for setting a room temperature.

Figure 2:
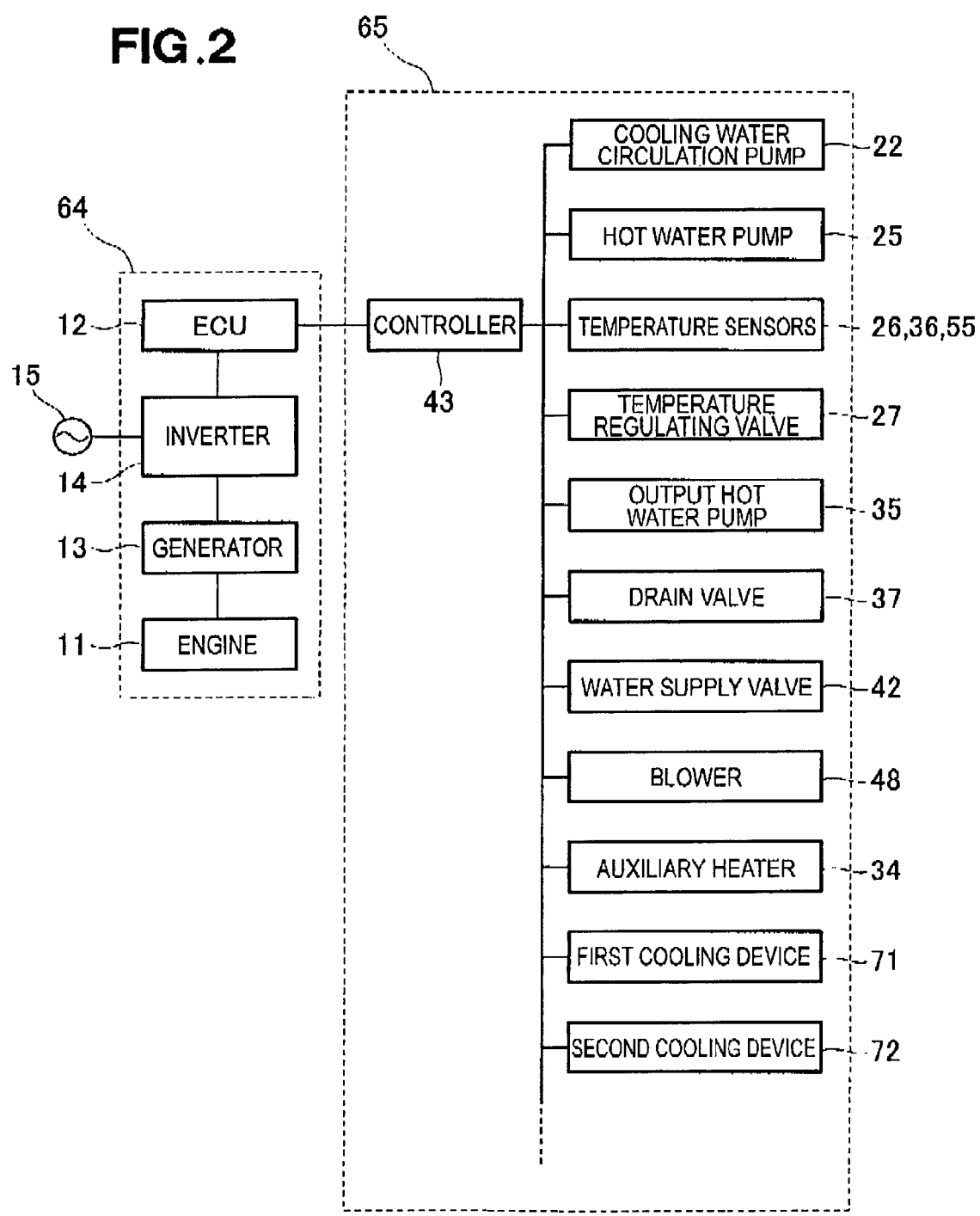
FIG. 2 is a block diagram showing a control system of the cogeneration system.

FIG. 2 shows a block diagram showing a control system of the cogeneration system 10. As shown in this figure, the cogeneration system 10 is formed by a generating unit 64 and a hot water supply unit 65. The generating unit 64 includes the above-mentioned engine 11, the ECU 12, the generator 13, and the inverter unit 14. The inverter unit 14 is connected to the output terminal of the generator 13 and outputs electric energy (electricity) after conversion of frequency and voltage of the electricity. The inverter unit 14 also has the function of a starter driver which switches the generator 13 to the function of a starter. The output of the inverter unit 14 is supplied via the changeover switch 16 (FIG. 1) to the external commercial power supply 15 when the generated electric energy reaches a predetermined value.

The hot water supply unit 65 includes the controller 43, which is connected to the cooling water circulation pump 22, the hot water pump 25, various temperature sensors 26, 36, 55, the temperature regulating valve 27, the output hot water pump 35, the drain valve 37, the water supply valve 42, the blower 48, the auxiliary heater 34, the first cooling device 71, the second cooling device 72, and so on. The controller 43 is connected to the ECU 12 and other valves and temperature sensors and controls the overall operation of the cogeneration system 10.

Figure 3:
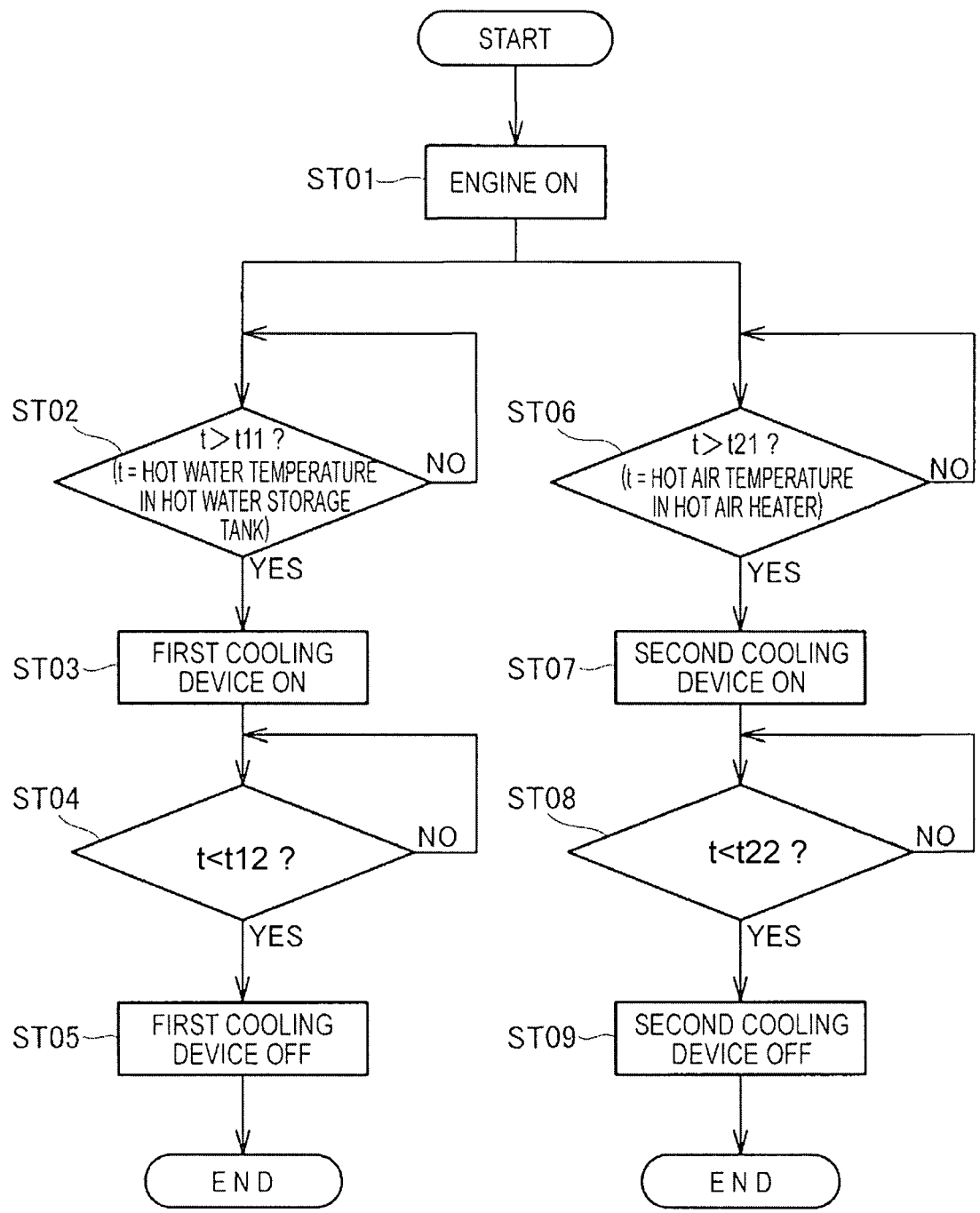
FIG. 3 is a flowchart showing a sequence of control operations of first and second cooling devices of the cogeneration system.

Referring now to a flowchart shown in FIG. 3, operation of the cogeneration system 10 will be described below in conjunction with operation of the first and second cooling devices 71, 72.

At a first step ST01, the engine 11 is started up. The generator 13 is thus driven by the engine 11 and generates electric energy (electricity). At the same time, cooling water is heated by waste heat from the engine 11 as it circulates through the cooling water circulation path 21. The thus heated cooling water passes through the waste-heat heat exchanger 17 during which time the heated water emits or transfers heat to water while being circulated through the hot water circulation path 24 while bypassing the hot water storage tank 23. By way of a heat exchange process performed by the waste-heat heat exchanger 17, the water circulating through the hot water circulation path 24 is heated. When the temperature of the water in the hot water circulation path 24 increases up to a predetermined value (70° C., for example), the temperature regulating valve 27 gradually opens to thereby start supplying hot water into the hot water storage tank 23. Thereafter, the hot water is stored in the hot water storage tank 23.

The next step ST02 determines, on the basis of a detection signal output from the temperature sensor 55 (FIG. 1), whether or not the temperature "t" of the hot water stored inside the hot water storage tank 23 exceeds a first predetermined value "t11" (t>t11). With a YES determination made at step ST02 (i.e., t>t11), the procedure goes on to a step ST03 where the first cooling device 71 is activated to cool that part of the cooling water which circulates through the bypass pipe 75. The heated cooling water, as it passes through the radiator 71 disposed in the bypass pipe 75, emits heat to the outside of the bypass pipe 75 and cools down accordingly. With this cooling, the temperature of the cooling water in the cooling water circulation path 21 drops gradually, which will lower the capacity of the waste-heat heat exchanger 17. Thus, the temperature of the hot water stored in the hot water storage tank 23 decreases gradually.

Step ST03 is followed by step ST04 where a determination is made as to whether the hot water temperature "t" in the hot water storage tank 23 falls below a second predetermined value "t12" (t<t12). The second predetermined value "t12" is set to be smaller than the first predetermined value "t11". With a YES determination at step ST04 (i.e., t<t12), the procedure advances to step ST05 where the first cooling device 71 is deactivated.

When a NO determination has been made at step ST02, monitoring of the hot water temperature "t" inside the hot water storage tank 23 is further continued by means of the temperature sensor 55 until the temperature "t" exceeds the first predetermined temperature "t11". Similarly, when a NO determination has been made at step ST04, monitoring of the hot water temperature "t" inside the hot water storage tank 23 is further continued by means of the temperature sensor 55 until the temperature "t" drops below the second predetermined temperature "t12". On-off control of the first cooling device 71 is thus completed.

Step ST01, which starts up the engine 11, is also followed by a step ST06 where on the basis of a detection signal output from the temperature sensor 54 (FIG. 1), a determination is made as to whether or not the temperature "t" of hot air inside the hot air heater 33 exceeds a first predetermined value "t21" (t>t21). With a YES determination made at step ST06 (i.e., t>t21), the procedure goes on to a step ST07 where the second cooling device 72 is activated to cool that part of the hot water which circulates through the bypass pipe 81. The hot water, as it passes through the radiator 82 disposed in the bypass pipe 81, emits heat to the outside of the bypass pipe 81 and cools down accordingly. With this cooling, the temperature of the hot water in the hot water circulation pipe 32 drops gradually, which will lower the capacity of the heat exchanger 49 of the hot air heater 33. Thus, the temperature of hot air output from the hot air heater 33 decreases gradually.

Step ST07 is followed by step ST08 where a determination is made as to whether the hot air temperature "t" in the hot air heater 33 falls below a second predetermined value "t22" (t<t22). The second predetermined value "t22" is set to be smaller than the first predetermined value "t21". With a YES determination at step ST08 (i.e., t<t22), the procedure advances to step ST09 where the second cooling device 72 is deactivated.

When a NO determination has been made at step ST06, monitoring of the hot air temperature "t" inside the hot air heater 33 is further continued by means of the temperature sensor 54 until the temperature "t" exceeds the first predetermined temperature "t21". Similarly, when a NO determination has been made at step ST08, monitoring of the hot air temperature "t" inside the hot air heater 33 is further continued by means of the temperature sensor 54 until the temperature "t" drops below the second predetermined temperature "t22". On-off control of the second cooling device 72 is thus completed.

As thus far described, the cogeneration system 10 includes the first cooling device 71 (indicated by the broken lines shown in FIG. 1) disposed in the cooling water circulation path 21 and the second cooling device 72 (indicated by the solid lines shown in FIG. 1) disposed in the hot water circulation pipe 32. Conventionally, when the hot water temperature inside the hot water storage tank 23 rises to an extent that sufficient cooling of the engine 11 can not be achieved, the engine 11 must be stopped. However, according to the present invention, because the first cooling device 71 is activated when the hot water temperature inside the hot water storage tank 23 exceeds a first predetermined value, the temperature of the waste-heat heat exchanger 17 is kept below the first predetermined value. This will allow for continuous running of the engine 11, leading to stable supply of electric power from the generator continuously driven by the engine 11.

Either of the first cooling device 71 or the second cooling device 72 may be omitted where necessary.

Figure 4:
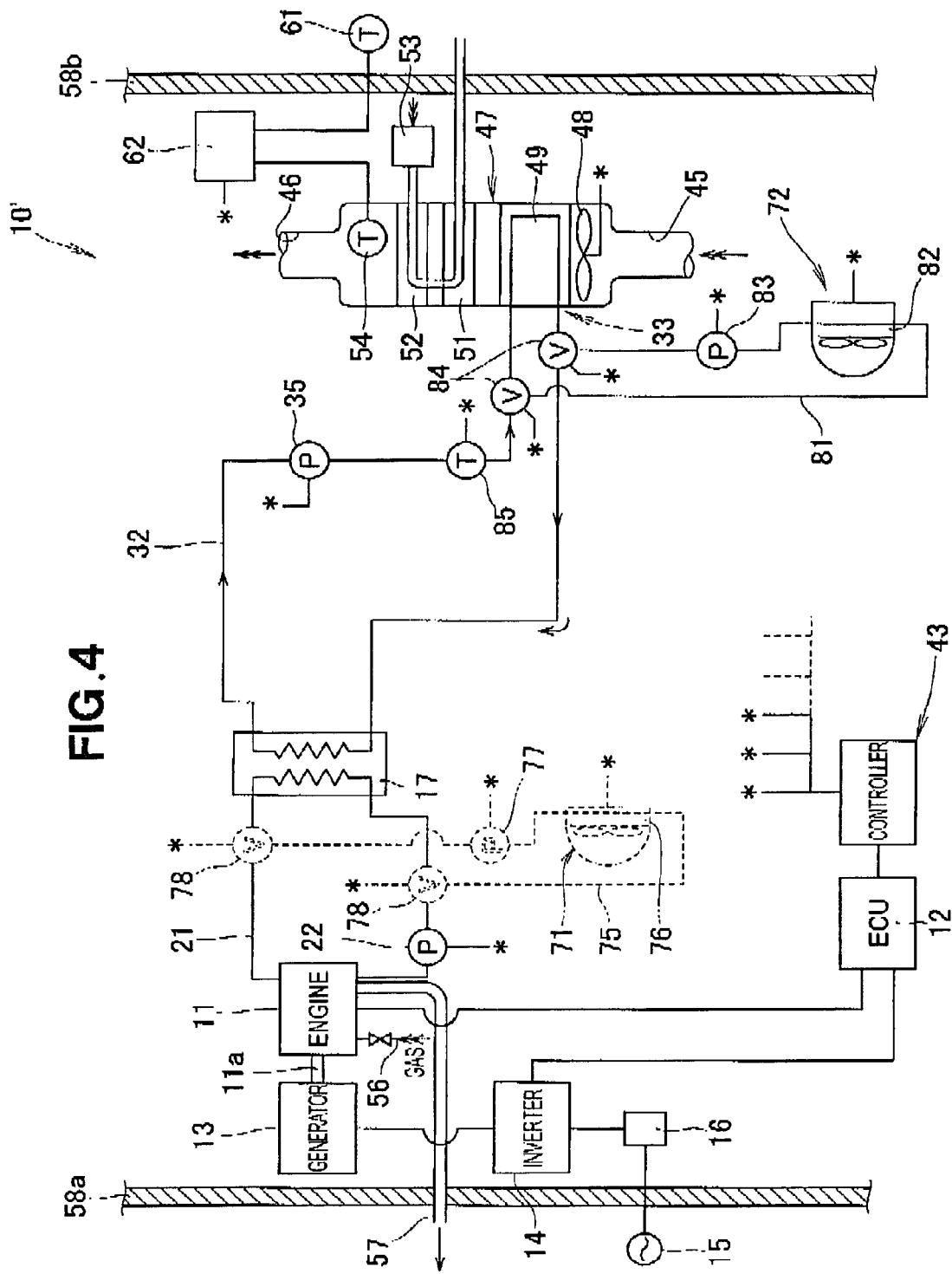
FIG. 4 is a diagrammatical view showing the general configuration of a cogeneration system according to a second embodiment of the present invention.

FIG. 4 diagrammatically shows the general configuration of a cogeneration system 10' according to a second embodiment of the present invention. Unlike the cogeneration system 10 of the first embodiment shown in FIG. 1, the cogeneration system 10' of the second embodiment is not equipped with a hot water storage tank. The cogeneration system 10' includes a first cooling means or device 71 and a second cooling means or device 72. The first cooling device 71 is disposed in a cooling water circulation path 21 extending between an engine 11 and a waste-heat heat exchanger 17 for circulation therethrough of cooling water. The second cooling device 72 is disposed in a hot water circulation pipe 32 extending between the waste-heat heat exchanger 17 and a hot air heater 33 for circulation therethrough of hot water. The hot water circulation pipe 32 is partially incorporated in a heat exchanger 49 of the hot air heater 33 so that the hot air heater 33 is able to heat outside air by using hot water output from the waste-heat heat exchanger 17. A temperature sensor 85 is disposed in a portion of the hot water circulation pipe 32 located outside the hot air heater 33. The first cooling device 71 is activated by a controller 43 when the temperature of the hot water in the hot water circulation pipe 32, which is measured by the temperature sensor 85, exceeds a first predetermined value. The second cooling device 72 is activated by the controller 43 when the temperature of hot air in the hot air heater 33, which is measured by a temperature sensor 54 disposed in a casing 47 of the hot air heater 33, exceeds a second predetermined value.

In the cogeneration system 10' of the second embodiment, because the first cooling device 71 is activated when the hot water temperature inside the hot water circulation pipe 32 exceeds the first predetermined value, the temperature of the waste-heat heat exchanger 17 is kept below the first predetermined value. This will allow for continuous running of the engine 11, ensuring continuous running of the engine-driven generator 13 leading to stable supply of electric power from the generator 13.

Obviously, various minor changes and modifications of the present invention are possible in light of the above teaching. It is therefore to be understood that within the scope of the appended claims the invention may be practiced otherwise than as specifically described.

What is claimed is:

1. A cogeneration system comprising:
an engine;
a generator driven by the engine to generate electric energy;
a waste-heat heat exchanger configured to heat cold water to thereby produce hot water by using waste heat from the engine as a first heat source;
a hot water storage tank for storing therein the hot water output from the waste-heat heat exchanger;
an auxiliary heating device disposed in a hot water circulation path extending between the waste-heat heat exchanger and the hot water storage tank;
a hot air heater having a hot air passage for circulating outside air through the hot air passage in order to generate hot air inside the hot air heater by using the hot water output from the waste-heat heat exchanger as a second heat source;
a cooling water circulation path extending between the engine and the waste-heat heat exchanger for circulation therethrough of cooling water;
a hot water circulation pipe extending between the hot water storage tank and the hot air heater for circulation therethrough of the hot water;
a first auxiliary heating device disposed in said hot water circulation pipe extending between the hot water storage tank and the hot air heater;
at least one of a first cooling device and a second cooling device, the first cooling device is disposed in the cooling water circulation path and the second cooling device is disposed in the hot water circulation pipe; and
a controller configured to activate said first cooling device, to cool the cooling water, when the temperature of the hot water stored in the hot water storage tank exceeds a first predetermined value, and activate said second cooling device, to cool the hot water, when the temperature of the hot air inside the hot air heater exceeds a second predetermined value.

2. The cogeneration system of claim 1, wherein the first cooling device includes a first bypass pipe branching off the cooling water circulation path and then returning to the cooling water circulation path, a first radiator disposed in the first bypass pipe for radiating heat from the cooling water to the outside of the first bypass pipe, a first pump disposed in the first bypass pipe for feeding the cooling water into the first radiator, and a pair of first water supply valves disposed between the cooling water circulation path and the first radiator and adapted to open to thereby allow the cooling water to be introduced into the first radiator.

3. The cogeneration system of claim 1, wherein
the second cooling device includes a second bypass pipe branching off the hot water circulation pipe and then returning to the hot water circulation pipe, a second radiator disposed in the second bypass pipe for radiating heat from the hot water to the outside of the second bypass pipe, a second pump disposed in the second bypass pipe for feeding the hot water into the second radiator, and a pair of second water supply valves disposed between the hot water circulation pipe and the second radiator and adapted to open to thereby allow the hot water to be introduced into the second radiator.

* * * * *